United States Patent [19]

Joecks et al.

[11] Patent Number: 5,319,179
[45] Date of Patent: Jun. 7, 1994

[54] METHOD AND APPARATUS FOR WELDING WORKPIECES MADE OF SUPERALLOYS

[75] Inventors: Konrad Joecks, Lehrte; Wolf Birner, Winsen/Aller, both of Fed. Rep. of Germany

[73] Assignee: MTU Maintenance GmbH, Langenhagen, Fed. Rep. of Germany

[21] Appl. No.: 993,411

[22] Filed: Dec. 21, 1992

[30] Foreign Application Priority Data

Dec. 19, 1991 [DE] Fed. Rep. of Germany ....... 4141927

[51] Int. Cl.$^5$ .............................................. B23K 9/235
[52] U.S. Cl. ................................ 219/137 R; 219/76.15
[58] Field of Search ................ 219/137 R, 136, 10.75, 219/76.14, 76.15, 137 WM

[56] References Cited

U.S. PATENT DOCUMENTS

| | | | |
|---|---|---|---|
| 2,184,534 | 12/1939 | Smith et al. | 219/137 R |
| 2,819,517 | 1/1958 | Pursell | 219/137 R |
| 4,141,127 | 2/1979 | Cretella et al. | |
| 4,574,172 | 3/1986 | Burack et al. | 219/10.75 |
| 4,859,489 | 8/1989 | Pinkhasoy | 219/76.14 |

FOREIGN PATENT DOCUMENTS 225739 10/1909 Fed. Rep. of Germany .
2831702 1/1980 Fed. Rep. of Germany .

*Primary Examiner*—Clifford C. Shaw
*Attorney, Agent, or Firm*—Ladas & Parry

[57] ABSTRACT

Apparatus for the deposition welding or the joint welding of a workpiece made of a superalloy by an arc welding process in which the workpiece is supported in a protective-gas container into which is placed a welding electrode and an induction coil for preheating the workpiece. Material of the same type of the workpiece is applied to the surface of the workpiece or to a welding joint thereof by arc welding produced by the welding electrode. The apparatus and associated method are particularly suitable for repairing age-hardened superalloys of engine blades.

17 Claims, 1 Drawing Sheet

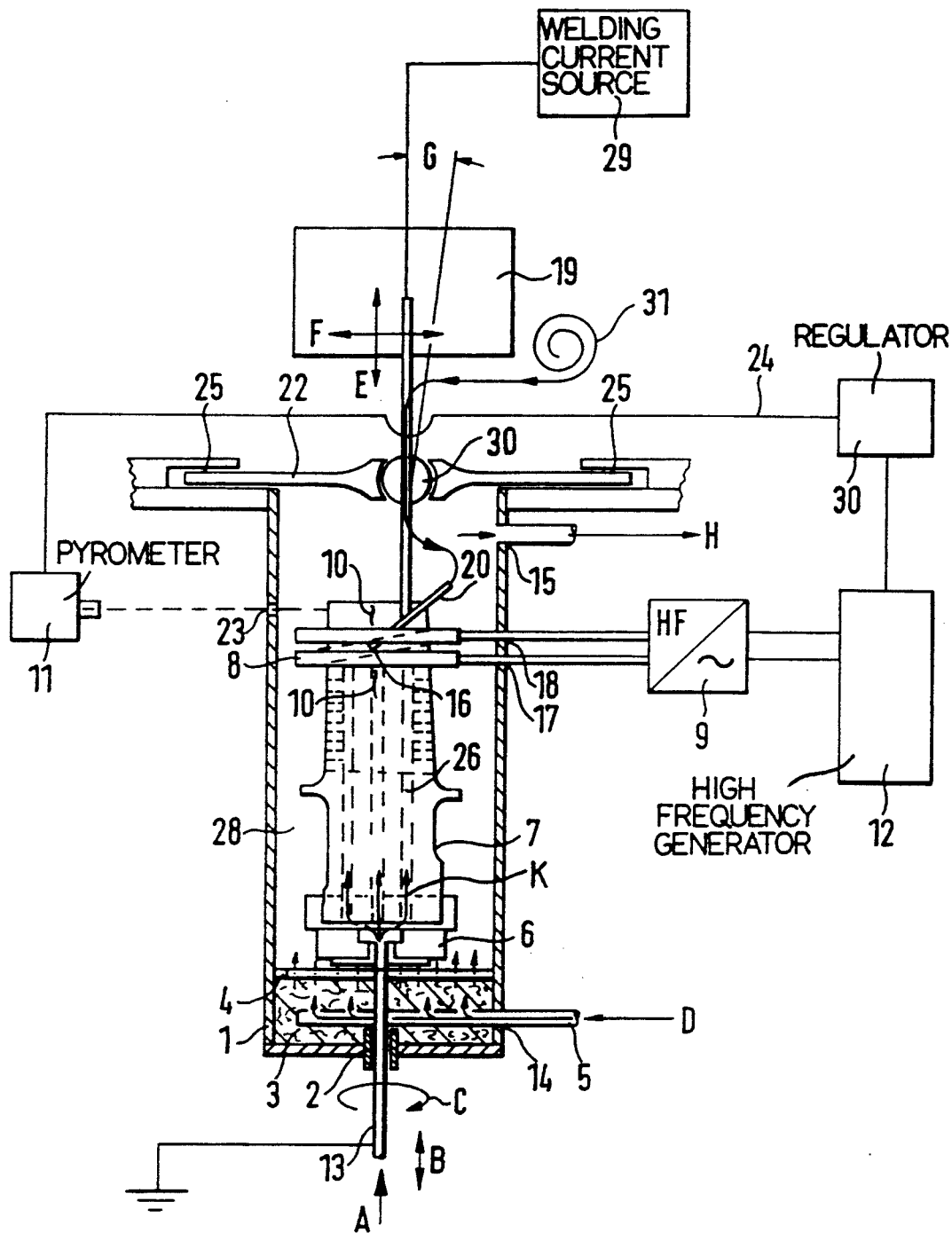

METHOD AND APPARATUS FOR WELDING WORKPIECES MADE OF SUPERALLOYS

FIELD OF THE INVENTION

This invention relates to a method and apparatus for the deposition welding or joint welding of workpieces made of superalloys by means of an arc welding technique with a protective gas, in which an arc is struck between a welding electrode and a workpiece which is preheated by an additional energy source.

BACKGROUND AND PRIOR ART

A method of this type is known from DE-PS 28 31 702. In this known method, preheating is effected by an additional energy source which comprises a plasma arc of a non-fusible electrode. At least part of the preheating plasma arc of the non-fusible electrode passes obliquely into an arc of a fusible electrode.

A disadvantage of this method is that it cannot be applied to age-hardened superalloys, since the area of effect of the additional energy source, i.e. the plasma arc, is extremely limited and its temperature cannot be controlled accurately.

A method of welding, melting or heating a workpiece by means of light energy is known from DE 22 57 739. This method is used in a modified manner for preheating superalloys using a protective gas. In this modified method the light energy is not concentrated on the object to be heated as in DE 22 57 39, but parallel radiators heat the workpiece over a large area. In this method, welding is not carried out by means of light energy, but by arc welding using a protective gas.

A disadvantage of this method is that parallel radiators are limited with respect to size and heating capacity so that the entire workpiece is heated to the preheating temperature and considerable preheating times of more than 5 minutes are necessary. At the same time, the housing containing the workpiece, the welding electrode and the protective gas is, disadvantageously, also partly heated. Finally, the light source represents a high cost factor because of its high power density, as the life of the light radiators is severely restricted by the high output required. Furthermore, in this method not only is the welding region of the workpiece heated, but the protective gas is also heated by convection via the irradiated protective gas housing with the result that there is considerable generation of heat in the work environment during the preheating and welding operations. This method involves high energy consumption. Furthermore, cooling means are necessary in particularly critical areas of the protective gas housing or container.

A method of repairing turbine blades by means of the deposition welding of superalloys is disclosed in U.S. Pat. No. 4,141,127. In this method, the welding stresses are subsequently reduced by a tempering process at 1200° C. for 1 hour. A disadvantage of this method is that this repair process with its subsequent tempering cannot be used for all precipitation-hardened superalloys. Furthermore, there is the danger of crack formation when passing through the temperature range of what is known as the ductility hole with $\gamma'$ constituents, and of workpiece distortion during welding and tempering.

SUMMARY OF THE INVENTION

An object of the invention is to provide a method and apparatus for arc welding workpieces of superalloys wherein energy is saved, the preheating time is shortened and the heating of the protective-gas container and the work area is reduced, and wherein accurate control and regulation of the preheating temperature guarantees crack-free and distortion-free deposition welding or joint welding of superalloys without adversely affecting the basic material, even during subsequent heat treatments.

This object is achieved according to the invention by first heating the workpiece to a preheating temperature in the welding area by means of an inductive heating means as an additional energy source, and then applying material of the same type as the superalloy of the workpiece to the surface of the workpiece or in the welding joint by means off arc welding.

The advantage of this method is that as a result of heating by induction, the welding area is accurately preheated to a temperature which corresponds to a stress-free annealing temperature known for the material of the workpiece. As a result there is a continuous reduction in stress to a residual value of the resident internal welding stresses which is non-critical for crack formation.

Inductive heating means and inductive heating methods are known per se and are used in crystal growth, in the preparation of high-temperature melting baths or in soldering in a vacuum or a protective gas using high-temperature solder. Their advantages for arc welding using a protective gas have not hitherto been obvious to the welding expert since the melting zone is always restricted to the interior of a coil in inductive heating. A welding zone would consequently have to be arranged in the interior of an inductor for effective preheating of the workpiece, which means negatively influencing the arc and insufficient working room for the welder for guiding the electrode.

If induction melting furnaces are used only for heating components, the induction coil used therefor, and which is usually wound onto a ceramic or quartz glass tube, completely surrounds the workpiece to be heated, which would not permit simultaneous welding manipulations of the workpiece.

A positive result of inductive preheating in the welding of superalloys is that the preheating temperature is reached within a few seconds, and consequently critical temperature ranges below the preheating temperature are quickly passed through. The continuous stress reduction in welding with inductive preheating furthermore prevents critical stress overlap as a result of structural transformations (fine $\gamma'$ deposits) which cause volume shrinkage stresses with simultaneous brittleness (ductility hole) and consequent crack formation in age-hardening superalloys when passing through average temperatures below the preheating temperature.

The preheating temperature lies between 900° and 1100° C. for $\gamma'$-depositing superalloys. The turns of the induction coil are water-cooled and are advantageously not subjected to wear.

In a preferred embodiment of the method according to the invention, the preheating temperature is held constant by means of a regulator which is operatively connected to a pyrometer and a high-frequency generator. This has the advantage that the preheating temperature is reached within a few seconds by means of inductive heating and is kept constant during sustained welding over a relatively long period. For this purpose, the pyrometer measuring point is on the side of the workpiece facing away from the welding area and induction heating is carried out at an induction frequency between 150 KHz and 500 KHz.

A preferred embodiment of apparatus for carrying out this method comprises a protective-gas container for receiving the workpiece which is provided with a pipe duct for conveying protective gas and with at least one rotary duct for moving the workpiece relative to the container. In the region of the weld of the workpiece inside the container, the workpiece is surrounded by a cooled induction coil which is operatively connected to a high-frequency generator by high-frequency ducts in the container, a pyrometer being arranged outside the container for monitoring the preheating temperature.

The advantage of this apparatus is that the workpiece may be rotated within the high-frequency field of one or more induction coil turns in order to set the workpiece and its welding area in an optimum position in relation to the induction coil, the pyrometer and the welding electrode with its welding burner and welding wire. A further advantage is that the workpiece may be processed under the simultaneous action of induction heating and arc welding. The apparatus furthermore guarantees reduced heating of the protective-gas container and the protective gas as compared to conventional preheating by lamps.

In a preferred embodiment of the invention the pyrometer is aimed through an optical window in the protective-gas container, at a measuring point located on a side of the workpiece facing away from the welding area. This arrangement has the advantage that the welding temperature and preheating temperature do not become combined at the measuring point on the workpiece and incorrect measurements of the preheating temperature during the welding process are avoided.

In a further preferred embodiment of the apparatus, the rotary duct is designed as a rotary lifting duct, with the result that a relatively large manipulation region is advantageously formed and the apparatus may be used for the most varied of workpiece sizes. Furthermore, there is preferably at least one manipulator arranged outside the protective-gas container for moving the welding electrode inside the container during arc welding, as a result of which welding is possible in a container which is closed on all sides. For this purpose, the protective-gas container has optical windows for monitoring, regulating and controlling preheating and welding.

BRIEF DESCRIPTION OF THE DRAWING

An embodiment of the invention will now be described with reference to the sole FIGURE of the accompanying drawing which shows schematically in partial section a preferred apparatus for carrying out the method according to the invention.

DETAILED DESCRIPTION OF A PREFERRED EMBODIMENT

In the drawing is seen an apparatus for the deposition welding or the joint welding of a workpiece comprising a protective-gas container 1 receiving a workpiece 7. The container 1 is provided with pipe ducts 14 and 15 for supplying and removing a protective gas in the directions of arrows D and H, respectively, and with at least one rotary lifting duct means 2 for moving the workpiece 7 in the directions of arrows B and C. In the region of a welding area 16 inside the container 1, the workpiece 7 is surrounded by a liquid-cooled induction coil 8 having, for example, two turns which are operatively connected to a high-frequency generator 12 via high-frequency ducts 17 and 18. A welding electrode 20 is positioned outside the workpiece in the vicinity of the region to be welded and within the turns of the coil 8. A micromanipulator 19 is disposed outside container 1 and serves for displacing the welding electrode 20 inside the container 1 during arc welding. The micromanipulator 19 can displace the welding electrode 20, with its welding burner and welding wire 31, in the directions of arrows E and F and also about a pivot axis in the direction G. The pivotal movement is obtained, for example, by an electrically insulated ball-and-socket joint 38, which is incorporated in a displaceable glass plate 22 made of quartz and serving as a viewing and monitoring window. Furthermore, the container 1 is provided with an additional optical window 23 for monitoring and regulating preheating of the workpiece by means of a pyrometer 11. The pyrometer 11 measures the preheating temperature of the workpiece 7 at a point thereof facing away from the welding area in order to prevent incorrect measurements of the preheating temperature. The pyrometer is operatively connected, via electric lines 24, to a regulator 30 and the high-frequency generator 12 which supplies the water-cooled induction coil 8 with energy via the high-frequency adapter 9.

The induction coil 8 comprises a copper pipe in an insulating material. A coolant, such as water, is passed through the copper pipe during induction heating. The insulating material is temperature and oxidation resistant and prevents formation of electric arcs and short circuits between the induction coil 8 and the welding electrode 20 or a TIG welding burner. In order to increase safety, the high-frequency generator 12 and welding current source 29 are electronically isolated from each other.

After the high-frequency generator 12 has been activated, the workpiece 7 reaches a preheating temperature between 900° and 1100° C. in the region of the welding area 16 within less than 12 seconds. In the region of a crack 10 in the workpiece, which has previously been ground out to form a welding joint, arc welding can now be carried out by the electrode 20 which is moved by the manipulator 19 which simultaneously guides the welding wire 31 in its center. In order to weld the complete crack 10, either the workpiece 7 can be optimally positioned and subsequently guided by the rotary lifting duct 2, or the welding electrode 20 can be optimally positioned and subsequently guided via the ball-and-socket joint 38 in the sliding plate 25.

For this purpose, the workpiece 7 is secured to a workpiece support 6 which may be raised or lowered in the direction of arrow B and rotated in the direction of arrow C by a pipe 13 of duct means 2 and supplied with protective gas in the direction of arrow A. If the workpiece 7 is a hollow component or, as in this example, an engine blade provided with cooling channels 26, the hollow spaces or cooling channels 26 are filled with protective gas flowing in the direction of arrows K via the workpiece support 6.

A network of conduits at the base of the container 1 is supplied with protective gas through the pipe duct 14 which is integral with a gas feedpipe 5. The network of conduits is surrounded, for example, by steel wool 3 in order to achieve uniform distribution of the protective gas at the base of the container 1. The protective gas subsequently flows through a perforated base plate 4 into working space 28 of the container 1 and during the entire process uniformly flows around the outer surfaces of the workpiece 7.

Although the invention has been described in relation to a specific embodiment thereof, it will become apparent to those skilled in the art that numerous modifications and variations can be made within the scope and spirit of the invention as defined in the attached claims.

What is claimed is:

1. A method for welding a workpiece made of a superalloy comprising placing in a container a workpiece to be welded made of a superalloy, conveying a protective gas through said container around said workpiece, electrically energizing an electrical induction coil disposed in said container around said workpiece in a region thereof to be welded, to preheat the workpiece in said region, arc welding said region of said workpiece subsequent to the preheating thereof, and sensing the temperature of said workpiece during the heating thereof by said induction coil to control the electrical energization of said induction coil for maintaining said preheating of said workpiece at a substantially constant, predetermined value.

2. A method according to claim 1, comprising maintaining a predetermined preheating temperature of said workpiece at a constant value by a regulator operatively connected to a pyrometer and a high-frequency generator connected to said coil.

3. A method according to claim 1, comprising effecting said arc welding with a welding electrode positioned outside the workpiece and within the electrical coil.

4. A method as claimed in claim 1, wherein said arc welding of said region of said workpiece includes applying material of the same type as said workpiece to said region at the surface of the workpiece or to a welding joint thereof.

5. Apparatus for welding a workpiece made of a superalloy comprising a container for receiving a workpiece to be welded made of a superalloy, duct means for conveying a protective gas through said container around said workpiece, an electrical induction coil in said container around said workpiece in a region thereof to be welded, means for electrically energizing said induction coil to preheat the workpiece in said region to be welded, arc welding means for welding said region of said workpiece subsequent to the preheating thereof, and means outside said container for sensing the temperature of said workpiece during the heating thereof by said induction coil to control the means which electrically energizes said induction coil for maintaining said preheating of said workpiece at a substantially constant, predetermined value.

6. Apparatus according to claim 5, comprising means for providing relative movement of said workpiece and said electrical induction coil.

7. Apparatus according to claim 5, comprising means for cooling said induction coil.

8. Apparatus according to claim 5, wherein said induction coil comprises a pipe through which a cooling fluid is passed.

9. Apparatus according to claim 8, wherein said means for electrically energizing said induction coil comprises a high frequency generator, said means for sensing the temperature of said workpiece comprising a pyrometer connected to said high frequency generator.

10. Apparatus according to claim 9, wherein said container is provided with a window through which said pyrometer views said workpiece, said window being located to face said workpiece on a side thereof opposite said region to be welded.

11. Apparatus according to claim 8, wherein said arc welding means for welding the region of the workpiece comprises a welding electrode outside said workpiece in facing relation to the region to be welded and within said induction coil.

12. Apparatus according to claim 11, comprising means supporting said welding electrode for movement thereof relative to said workpiece by manipulation from outside said container.

13. Apparatus according to claim 12, wherein said means supporting said welding electrode comprises a displaceable glass plate, and a pivot means supported by said glass plate and supporting said welding electrode.

14. Apparatus according to claim 8, wherein said pipe of said induction coil is made of electrically conductive material.

15. Apparatus according to claim 8, wherein said pipe of said induction coil is made of copper in an electrically insulative covering.

16. Apparatus according to claim 5, comprising a rotary lifting duct in said container supporting said workpiece for rotatable and vertically displaceable movement.

17. Apparatus according to claim 16, comprising means for passing a protective gas through said rotary lifting duct to said workpiece.

* * * * *